United States Patent
Kim

(10) Patent No.: US 9,819,058 B2
(45) Date of Patent: Nov. 14, 2017

(54) PROTECTION CIRCUIT MODULE AND BATTERY PACK INCLUDING THE SAME

(75) Inventor: Bongyoung Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1444 days.

(21) Appl. No.: 13/293,872

(22) Filed: Nov. 10, 2011

(65) Prior Publication Data

US 2012/0121945 A1  May 17, 2012

(30) Foreign Application Priority Data

Nov. 11, 2010 (KR) ........................ 10-2010-0111993

(51) Int. Cl.
| | | |
|---|---|---|
| *H01M 10/42* | (2006.01) | |
| *H01M 2/04* | (2006.01) | |
| *H01M 2/22* | (2006.01) | |
| *H01M 2/34* | (2006.01) | |
| *H01M 2/02* | (2006.01) | |

(52) U.S. Cl.
CPC ....... *H01M 10/425* (2013.01); *H01M 2/0404* (2013.01); *H01M 2/22* (2013.01); *H01M 2/348* (2013.01); *H01M 2/0207* (2013.01); *H01M 2200/10* (2013.01); *H01M 2200/106* (2013.01)

(58) Field of Classification Search
CPC ....... H01M 2200/10; H01M 2200/106; H01M 2/22; H01M 10/425
See application file for complete search history.

(56) References Cited

U.S. PATENT DOCUMENTS

| | | | |
|---|---|---|---|
| 2008/0118820 A1 | 5/2008 | Jang et al. | |
| 2009/0086398 A1 | 4/2009 | Jang | |
| 2010/0053835 A1 | 3/2010 | Kwag et al. | |
| 2010/0129687 A1 | 5/2010 | Kim | |
| 2010/0159291 A1* | 6/2010 | Kim ............... | B23K 37/0443 429/7 |
| 2011/0039132 A1* | 2/2011 | Do ............... | H01M 10/42 429/7 |

FOREIGN PATENT DOCUMENTS

| | | |
|---|---|---|
| KR | 10-0646519 | 11/2006 |
| KR | 1020080045946 | 5/2008 |
| KR | 10-0871526 | 11/2008 |
| KR | 10-2009-0055699 | 6/2009 |
| KR | 100907636 | 7/2009 |
| KR | 1020100028010 | 3/2010 |
| KR | 1020100058100 | 6/2010 |

OTHER PUBLICATIONS

Korean Notice of Allowance dated Nov. 29, 2012 by KIPO in connection with Korean Application No. 10-2010-0111993 and Request for Entry of the Accompanying Office Action attached herewith.

\* cited by examiner

*Primary Examiner* — Ladan Mohaddes

(74) *Attorney, Agent, or Firm* — Robert E. Bushnell, Esq.

(57) ABSTRACT

A protection circuit module which is welded to a connection tab and a PTC device without affecting a printed circuit board, and a battery pack including the same are provided. One embodiment of the present invention provides a battery pack having a bare cell and a protection circuit module electrically connected to the bare cell. The protection circuit module includes a printed circuit board, a connection tab positioned on a bottom surface of the printed circuit board, and a positive temperature coefficient (PTC) device electrically connected to the connection tab. The PTC device has a first lead coupled to a bottom surface of the connection tab, a PTC body electrically connected to the first lead, and a second lead electrically connected to the PTC body.

12 Claims, 8 Drawing Sheets

PROTECTION CIRCUIT MODULE AND BATTERY PACK INCLUDING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Nov. 11, 2010 and there duly assigned Serial No. 10-2010-0111993.

BACKGROUND OF THE INVENTION

Field of the Invention

One embodiment of the present invention relates to a protection circuit module and a battery pack including the same, and more particularly, to a protection circuit module in which a printed circuit board is not disadvantageously affected when a connection tab and a PTC device are welded to the protection circuit module, and a battery pack including the same.

Description of the Related Art

In general, a battery pack includes a bare cell and a protection circuit module electrically connected to the bare cell. The protection circuit module controls charging and discharging of the bare cell. The protection circuit module includes a protection device such as a positive temperature coefficient (PTC) device or a thermal fuse. The protection device may be electrically connected to the bare cell in order to prevent electric current from flowing to/from the exterior of a battery when the temperature of the battery dramatically rises or abnormality occurs to the battery at a predetermined voltage due to excessive charging or discharging of the battery.

The protection device is welded to a bottom surface of the protection circuit module; therefore, external impacts may be disadvantageously applied to the protection circuit module thereby resulting in breaking of a soldered portion at which the protection device is welded to the protection circuit module.

SUMMARY OF THE INVENTION

It is therefore an aspect of the present invention to provide a protection circuit module in which a printed circuit board is not disadvantageously affected when a connection tab and a PTC device are welded to the protection circuit module and to a bare cell, and a battery pack including the same.

In one embodiment of the present invention, a battery pack may have a bare cell and a protection circuit module electrically connected to the bare cell. The protection circuit module includes a printed circuit board, a connection tab is positioned on a bottom surface of the printed circuit board, and a positive temperature coefficient (PTC) device may be electrically is connected to the connection tab. The PTC device may have a first lead coupled to a bottom surface of the connection tab, a PTC body electrically connected to the first lead, and a second lead electrically connected to the PTC body.

The printed circuit board may have a spaced-apart portion formed therein, and the connection tab may be coupled to a bottom surface of the spaced-apart portion, and the connection tab may have a first region corresponding to the spaced-apart portion.

The first lead of the PTC device may be welded to a bottom surface of the first region of the connection tab and may be electrically connected to bottom surface of the connection tab.

The bare cell may include an electrode assembly; a can housing the electrode assembly; a cap assembly coupled to an upper portion of the can; and an electrode terminal electrically connected to the electrode assembly and formed at the cap assembly.

The second lead of the PTC device may be welded to the electrode terminal of the bare cell.

The battery pack may further include a lower case within which the bare cell is seated, and an upper case covering the protection circuit module.

In another embodiment of the present invention, a protection circuit module may include a printed circuit board; a connection tab positioned on a bottom surface of the printed circuit board; and a PTC device having a first lead electrically connected to the connection tab and coupled to the bottom surface of the connection tab, a PTC body electrically connected to the first lead, and a second lead electrically connected to the PTC body.

The printed circuit board may have a spaced-apart portion formed therein, and the connection tab may have a first region coupled to a bottom surface of the spaced-apart portion and corresponding to the spaced-apart portion.

The printed circuit board may have a terminal hole formed at the center of the printed circuit board, and the second lead of the PTC device may be spaced apart from the printed circuit board and formed at a location corresponding to the terminal hole.

As described above, in accordance with the illustrated embodiments of the present invention, in the protection circuit module and the battery pack including the same, the PTC device and the connection tab are welded to each other at a spaced-apart portion, thereby preventing a soldered portion of between the connection tab and the printed circuit board from being melted and causing electric shorts or the connection tab from being dislodged from the printed circuit board.

In addition, in the protection circuit module and the battery pack including the same, a first region that is not solder with the printed circuit board is formed in the connection tab, the PTC device is welded to the first region, so that the printed circuit board may not be affected by the welding.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, examples of embodiments of the invention will be described in detail with reference to the accompanying drawings such that they can easily be made and used by those skilled in the art.

Figure 1A:
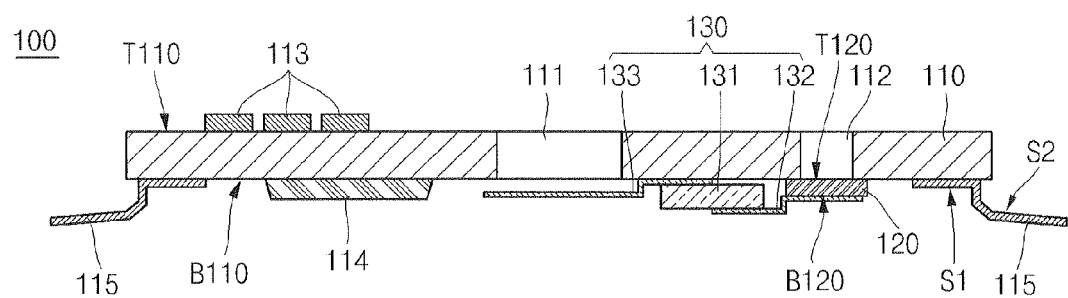
FIG. 1A is a cross-sectional view of a protection circuit module constructed as an embodiment of the present invention.
Figure 1B:
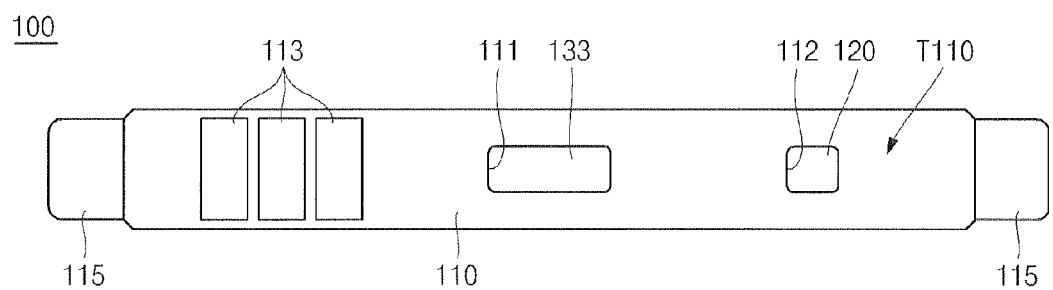
FIG. 1B is a plan view of the protection circuit module shown in FIG. 1A.
Figure 1C:
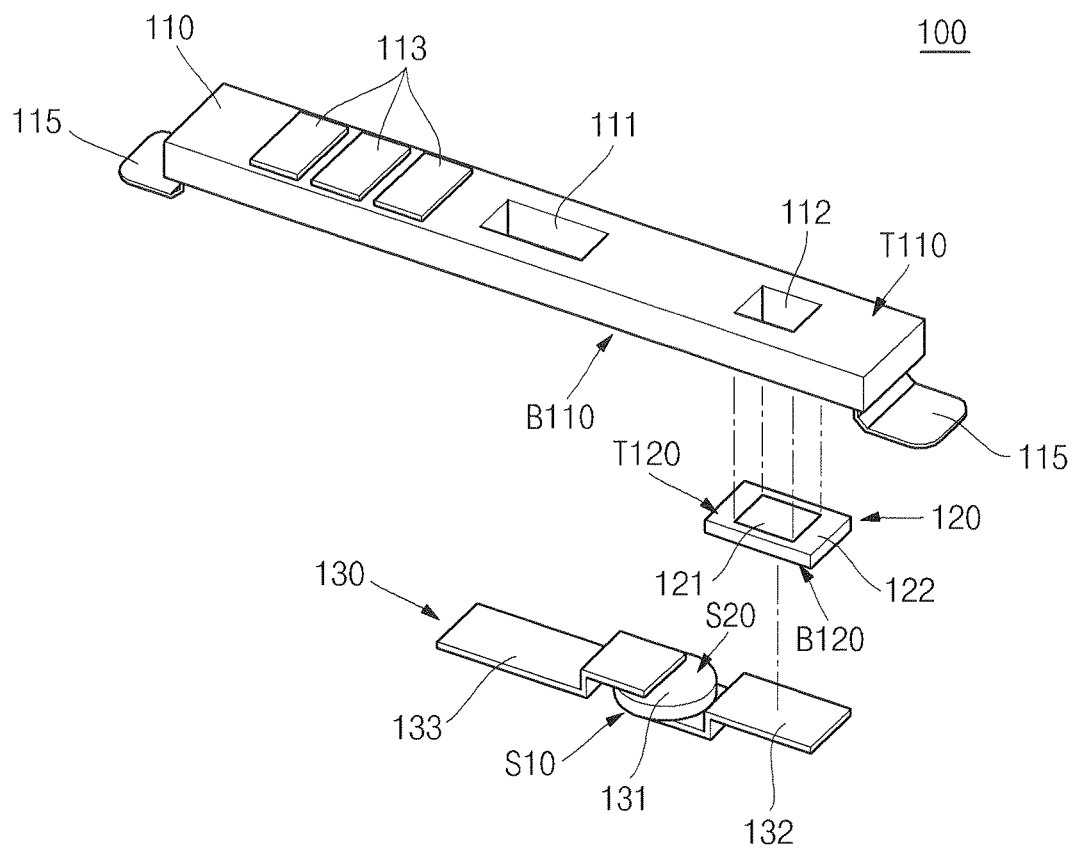
FIG. 1C is an exploded oblique view of the protection circuit module shown in FIG. 1A.
Figure 1D:
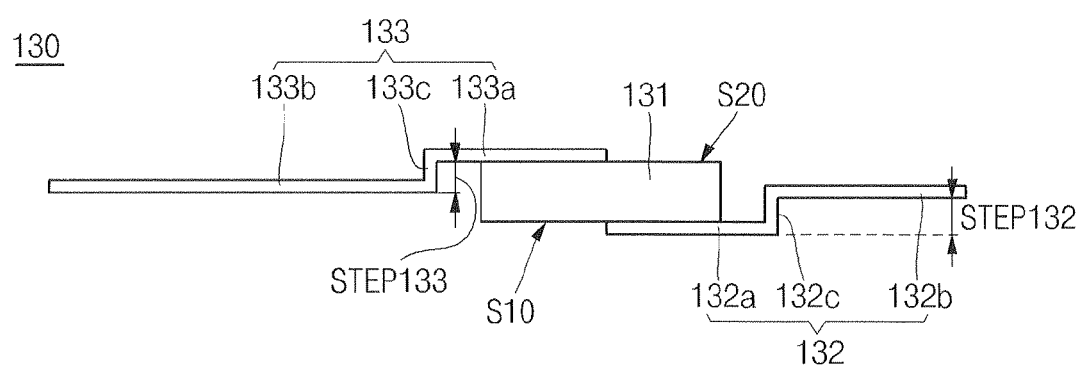
FIG. 1D is a side view of a PTC device shown in FIG. 1A.
Figure 1E:
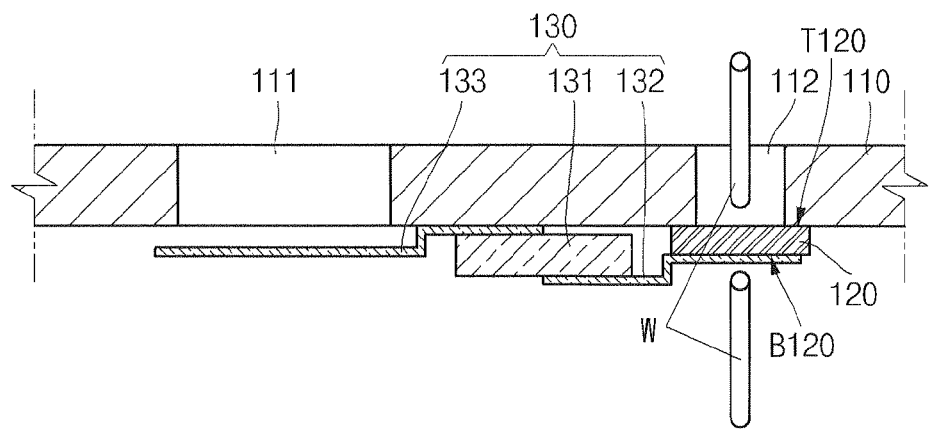
FIG. 1E is a cross-sectional view illustrating a method of welding the PTC device shown in FIG. 1A to a connection tab.

FIG. 1A is a cross-sectional view of a protection circuit module constructed as an embodiment of the present invention, FIG. 1B is a plan view of the protection circuit module shown in FIG. 1A, FIG. 1C is an exploded oblique view of the protection circuit module shown in FIG. 1A, FIG. 1D is a side view of a PTC device shown in FIG. 1A, and FIG. 1E is a cross-sectional view illustrating a method of welding the PTC device shown in FIG. 1A to a connection tab.

Referring to FIGS. 1A through 1E, the protection circuit module 100 includes a printed circuit board 110, a connection tab 120 and a positive temperature coefficient (PTC) device 130.

The printed circuit board 110 may be made of a resin shaped of a plate. A terminal hole 111 may be formed at the center of the printed circuit board 110, and a spaced-apart portion 112 is formed at one side of the printed circuit board 110. An external terminal 113 is formed on a top surface T110 of the printed circuit board 110, and a circuit device 114 is formed on a bottom surface B110 of the printed circuit board 110. In addition, a positive electrode lead 115 may be formed on the bottom surface B110 of either one of or both opposite sides of the printed circuit board 110.

The terminal hole 111 may be a through hole used for welding an electrode terminal of the bare cell to the PCT device 130 when the protection circuit module 100 is combined with and coupled to the bare cell.

The spaced-apart portion 112 may be a through hole penetrating the printed circuit board 110 from the top surface T110 to the bottom surface B110. The connection tab 120 may be coupled to the spaced-apart portion 112. The spaced-apart portion 112 may be disposed at one side of the terminal hole 111. In one embodiment, the spaced-apart portion 112 may be aligned with the terminal hole 111 along a longer side of the printed circuit board 110. Similar to the terminal hole 111, the spaced-apart portion 112 may be a hole also used for welding. That is to say, the spaced-apart portion 112 is a hole used for welding the connection tab 120 to the PTC device 130. In addition, since welding of the connection tab 120 and the PTC device 130 is performed in the spaced-apart portion 112, the printed circuit board 110 is not disadvantageously affected by welding.

The external terminal 113 is a terminal for connecting the protection circuit module 110 to an external electronic device (not shown), and is formed to be exposed to the outside.

A plurality of the circuit device 114 may be formed, constituting a circuit of controlling charging and discharging of a battery. Although the illustrated circuit device 114 is formed on the bottom surface B110 of the printed circuit board 110, the circuit device 114 may be formed on the top surface T110 of the printed circuit board 110.

One side S1 of the positive electrode lead 115 may be coupled to the bottom surface B110 of the printed circuit board 110, and the other side S2 thereof may be bent and extends towards the exterior of the battery. That is to say, the other side S2 of the positive electrode lead 115 is formed to protrude from the printed circuit board 110.

The connection tab 120 may be a substantially rectangular metal plate made of conductive material, for example, nickel. As shown in FIG. 1C, the connection tab 120 may be divided into a first region 121 and a second region 122.

The first region 121 may be formed at the center of the connection tab 120 and the area of the first region 121 may be the same as or smaller than the area of the spaced-apart portion 112. The first region 121 is an area welded to the PCT device 130 in order to electrically connect the connection tab 120 and the PCT device 130 to each other.

The second region 122 is formed at an area excluding the first region 121, that is, at the edge of the connection tab 120. The second region 122 is an area soldered to the printed circuit board 110. In the connection tab 120, the second region 122 may be soldered to the printed circuit board 110 in whole or in part.

The connection tab 120 may be soldered to the bottom surface B110 of the printed circuit board 110 having the spaced-apart portion 112 formed therein and be electrically connected to the printed circuit board 110. That is to say, the first region 121 of the connection tab 120 is coupled to the spaced-apart portion 112, and the second region 122 is soldered to the printed circuit board 110. Therefore, since the second region 122 is soldered to the printed circuit board 110 when the PTC device 130 is welded to the first region 121 of the connection tab 120, a soldered portion between the connection tab 120 and the printed circuit board 110 may not be broken due to external impacts, and shocks may not be applied to the printed circuit board 110.

The PCT device 130 may be electrically connected to the connection tab 120. The PCT device 130 includes a PCT body 131, a first lead 132 and a second lead 133.

The PTC body 131 may be fabricated by dispersing conductive particles in a crystalline polymer. Here, the conductive particles may be carbon particles, and the crystalline polymer may be a synthetic resin, such as polyolefin resin. The PTC body 131 may allow for the flow of electric current between the first lead 132 and the second lead 133 because the conductive particles are merged at a predetermined temperature or below. When the temperature exceeds the predetermined temperature, however, the PTC body 131 may prevent or suppress the flow of electric current between the first lead 132 and the second lead 133 because the conductive particles are separated from each other due to Swelling of the crystalline polymer, resulting in a sharp increase in the resistance. Accordingly, the PTC body 131 may serve as a safety device of preventing rupture of a battery by being electrically connected with the battery. Under this circumstance, the temperature of the PCT body 131 exceeds the predetermined temperature due to the heat generated by overcharging of the battery. When the PTC body 131 is cooled down again to the predetermined temperature or below, the crystalline polymer shrinks to merge the conductive particles, allowing for the flow of electric current.

The first lead 132 may be formed on one surface S10 of the PCT body 131 and is electrically connected to the connection tab 120. In addition, the first lead 132 may be made of nickel to be welded to the connection tab 120. Referring to FIG. 1D, the first lead 132 includes a first conductive portion 132a connected to the PTC body 131, a second conductive portion 132b connected to the connection tab 120, and a connecting portion 132c connecting the first conductive portion 132a and the second conductive portion 132b to each other. The connecting portion 132c is perpendicularly formed such that there is a step difference STEP 132 between the first conductive portion 132a and the second conductive portion 132b. That is to say, the first conductive portion 132a and the second conductive portion 132b may be formed in parallel with each other, and the connecting portion 132c is formed to be perpendicular to the first conductive portion 132a and to the second conductive portion 132b. In addition, the second conductive portion 132b of the first lead 132 may be welded to the first region 121 of the connection tab 120 to then be coupled to the bottom surface B120 of the connection tab 120. Here, the second conductive portion 132b may be welded to the first region 121 by resistance welding or ultrasonic welding, but not limited thereto.

The second lead 133 may be formed on the other surface, for example, the upper surface S20 of the PCT body 131 and is electrically connected to an electrode terminal of the bare cell, which will later be described. In addition, similar to the first lead 132, the second lead 133 may be also made of nickel. Referring to FIG. 1D, the second lead 133 includes a first conductive portion 133a connected to the PTC body 131, a second conductive portion 133b connected to the electrode terminal of the bare cell, and a connecting portion 133c connecting the first conductive portion 133a and the second conductive portion 133b to each other. The connecting portion 133c may be perpendicularly formed such that there is a step difference STEP 133 between the first conductive portion 133a and the second conductive portion 133b. That is to say, the first conductive portion 133a and the second conductive portion 133b may be formed in parallel with each other, and the connecting portion 133c may be formed to be perpendicular to the first conductive portion 133a and to the second conductive portion 133b. In addition, the second conductive portion 133b of the second lead 133 may be formed at a location corresponding to the terminal hole 111 of the printed circuit board 110. Therefore, the second conductive portion 133b of the second lead 133 may be welded to the electrode terminal of the bare cell through the terminal hole 111.

Referring to FIG. 1E, the spaced-apart portion 112 is in the form of a through hole. Thus, a welding rod (w) contacts top and bottom surfaces T120 and B120 of the connection tab 120, thereby allowing the second conductive portion 132b to be welded to the first region 121 of the connection tab 120.

As described above, in the protection circuit module according to the illustrated embodiment, since the PTC device 130 and the connection tab 120 are welded to each other at the spaced-apart portion 112, it is possible to prevent a soldered portion between the connection tab 120 and the printed circuit board 110 from being melted to cause short circuits. In addition, it is possible to prevent the connection tab 120 from being dislodged from the printed circuit board 110.

A protection circuit module constructed as another embodiment of the present invention will now be described.

Figure 2A:
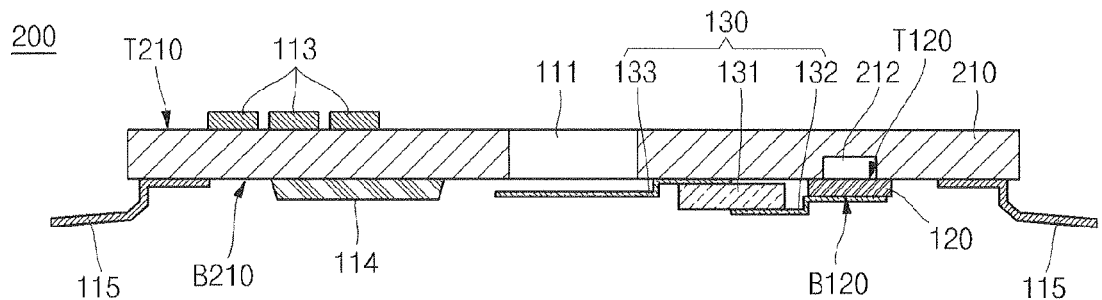
FIG. 2A is a cross-sectional view of a protection circuit module constructed as another embodiment of the present invention.
Figure 2B:
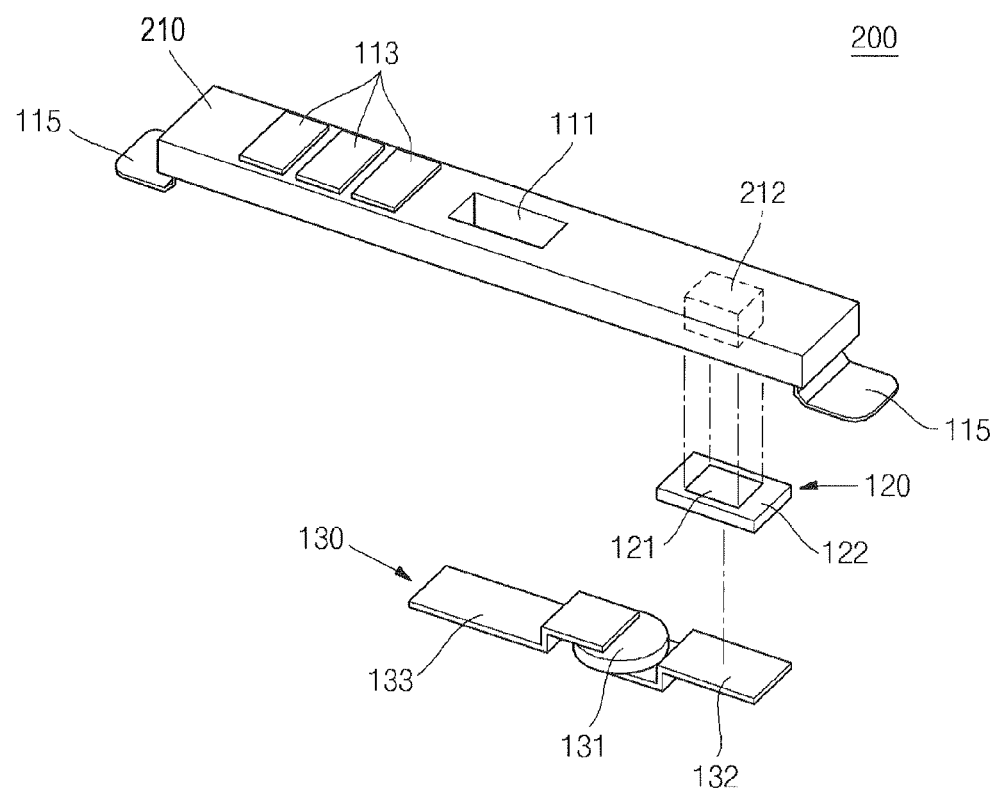
FIG. 2B is an exploded oblique view of the protection circuit module shown in FIG. 2A.
Figure 2C:
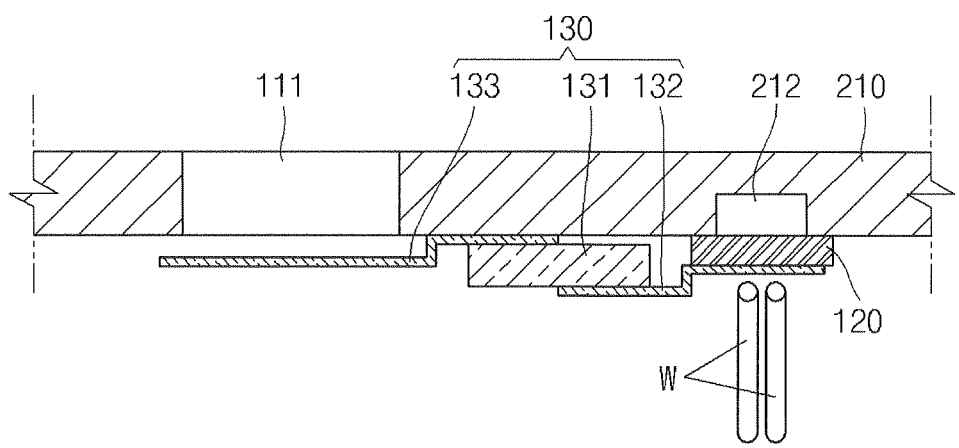
FIG. 2C is a cross-sectional view illustrating a method of welding the PTC device shown in FIG. 2A to a connection tab.

FIG. 2A is a cross-sectional view of a protection circuit module constructed as another embodiment of the present invention, FIG. 2B is an exploded oblique view of the protection circuit module shown in FIG. 2A, and FIG. 2C is a cross-sectional view illustrating a method of welding the PTC device 130 shown in FIG. 2A to a connection tab 120.

A protection circuit module 200 constructed as another embodiment of the present invention is substantially the same as the protection circuit module 100 shown in FIG. 1A, and only differences therebetween will now be described.

Referring to FIGS. 2A through 2C, the protection circuit module 200 constructed as the illustrated embodiment of the present invention includes a printed circuit board 210, a connection tab 120 and a PCT device 130.

The printed circuit board 210 is made of a resin shaped of a plate. A terminal hole 111 is formed at the center of the printed circuit board 210, and a spaced-apart portion 212 is formed at one side of the printed circuit board 210. An external terminal 113 is formed on a top surface T210 of the printed circuit board 210, and a circuit device 114 is formed on a bottom surface B210 of the printed circuit board 210. In addition, a positive electrode lead 115 is formed on the bottom surface B210 of either side of the printed circuit board 210.

The spaced-apart portion 212 may be formed on the bottom surface B210 of the printed circuit board 210 in the form of a hole. The connection tab 120 is engaged with the spaced-apart portion 212.

Referring to FIG. 2C, since the spaced-apart portion 212 may be formed in the form of a groove, a welding rod (w) contacts the connection tab 120 from the below of the connection tab 120 to then allow the first lead 132 of the PTC device 130 to be welded to the connection tab 120. As described above, since the first lead 132 of the PTC device 130 and the connection tab 120 are welded to each other at the spaced-apart portion 212, it is possible to prevent a soldered portion between the connection tab 120 and the printed circuit board 210 from being melted to cause shorts, and to prevent the connection tab 120 from being dislodged from the printed circuit board 210. In this embodiment, the spaced-apart portion 212 may be a groove and does not penetrate the printed circuit board 210.

A battery pack including a protection circuit module constructed as an embodiment of the present invention will now be described.

Figure 3A:
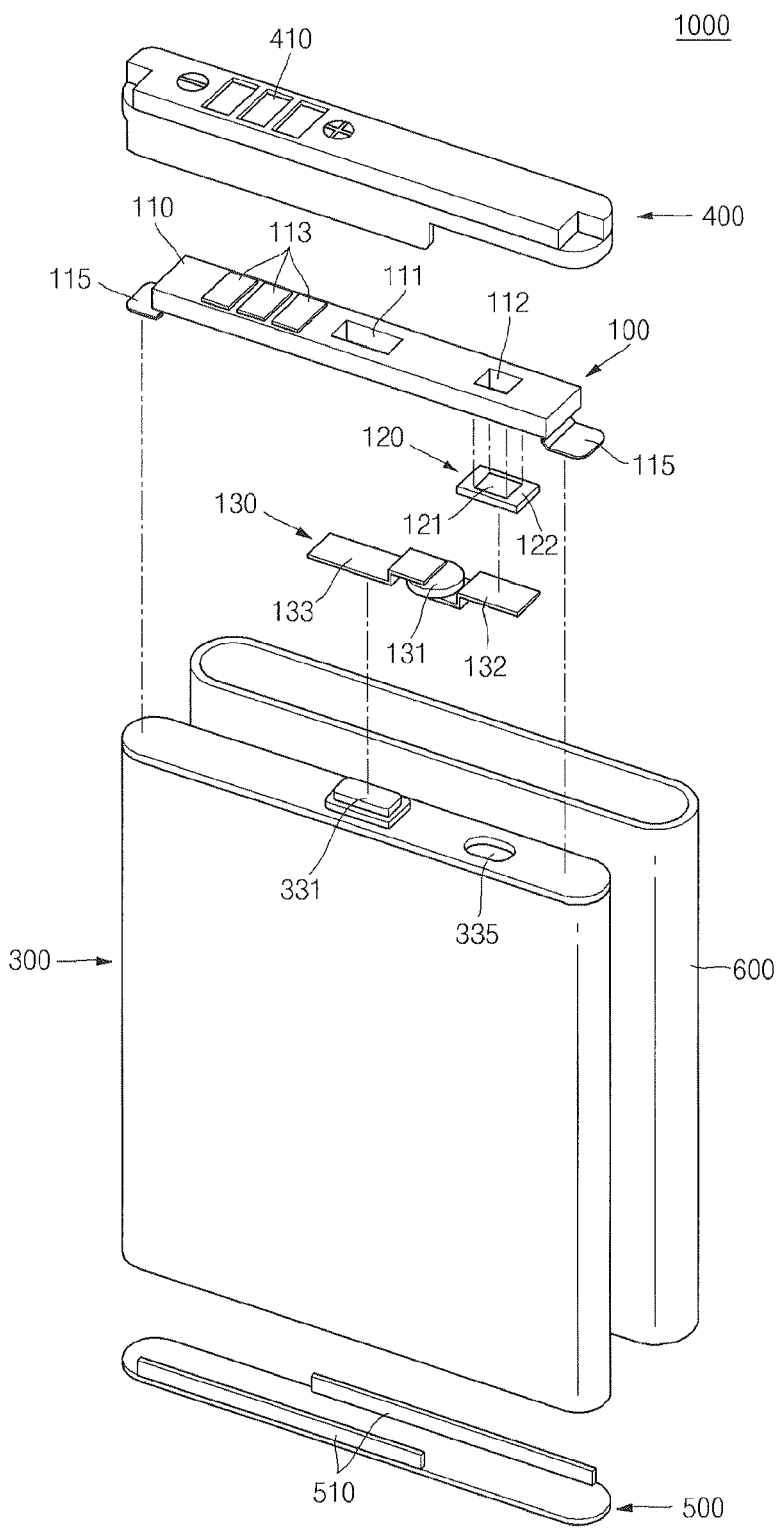
FIG. 3A is an exploded oblique view of a battery pack constructed as another embodiment of the present invention.
Figure 3B:
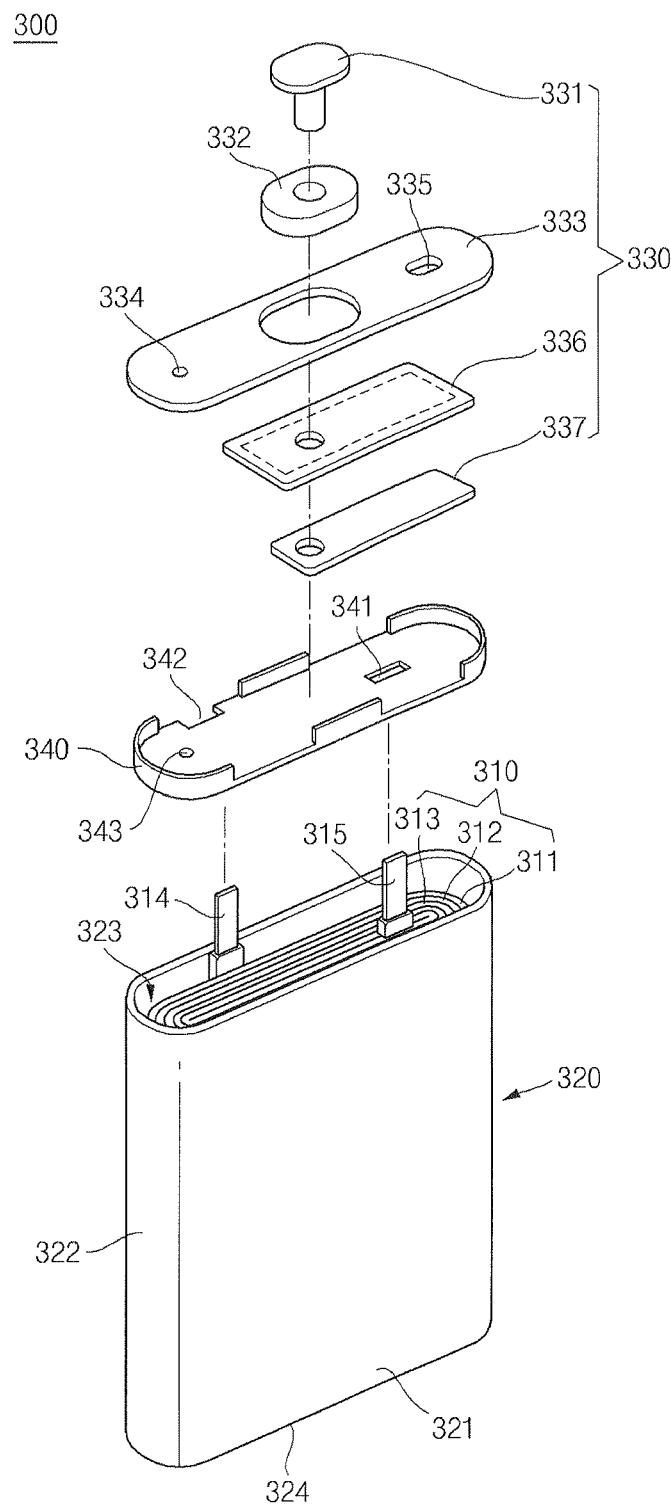
FIG. 3B is an exploded oblique view of a bare cell shown in FIG. 3A.

FIG. 3A is an exploded oblique view of a battery pack according to an embodiment of the present invention, and FIG. 3B is an exploded oblique view of a bare cell shown in FIG. 3A.

Referring to FIGS. 3A and 3B, the battery pack 1000 includes a bare cell 300, a protection circuit module 100, an upper case 400, a lower case 500, and a label sheet 600.

Referring first to FIG. 3B, the bare cell 300 includes an electrode assembly 310, a can 320, a cap assembly 330, and an insulation case 340.

The electrode assembly 310 is formed by interposing a separator 312 between a positive electrode plate 311 and a negative electrode plate 313 facing each other and winding the stacked structure. The positive electrode plate 311 has a positive electrode tab 314, and the negative electrode plate 313 has a negative electrode tab 315. The separator 312 insulates the positive electrode plate 311 and the negative electrode plate 313 from each other and is formed of a porous film so as to allow an electrolyte to pass therethrough.

The can 320 includes a pair of oppositely disposed long side surfaces 321, a pair of oppositely disposed short side surfaces 322, and a bottom surface 324, forming a substantially box-like shape. An upper portion of the can 320 is opened, forming an upper opening 323, through which the electrode assembly 310 is inserted. The upper portion of the can 320 is sealed by a cap assembly 330, thereby preventing leakage of the electrolyte. The can 320 may be made of aluminum or an aluminum alloy, which is lightweight and soft. In addition, the can 320 may be formed by deep drawing. The pair of long side surfaces 321, the pair of short side surfaces 322, and the bottom surface 324 are integrally and simultaneously formed with each other as a single body.

The cap assembly 330 includes an electrode terminal 331, a cap plate 333, an insulation plate 336 and a terminal plate 337. A gasket tube 332 is inserted between the cap plate 333 and an electrode terminal 331, and the electrode terminal 331 and the terminal plate 337 are electrically connected to each other. The insulation plate 336 electrically insulates the cap plate 333 and the terminal plate 337 from each other. An electrolyte injection hole 334 is formed at one side of the cap plate 333. A plug is installed to plug the electrolyte injection hole 334 once the electrolyte is injected into the electrolyte injection hole 334. In addition, a safety vent 335 is formed at the other side of the cap plate 333. The safety vent 335 may be thinner than the other parts of the cap plate 333. When the internal pressure of the can 320 exceeds an operating pressure of the safety vent 335, the safety vent 335 is opened to release internal gases.

The insulation case 340 is formed in the upper opening 323 of the can 320 to then electrically insulate the electrode assembly 310 and the cap assembly 330 from each other. The insulation case 340 may be made of an electrical insulating polymer resin, for example, polypropylene. A negative electrode tab hole 341 is formed at one side of the insulation case 340 to allow the negative electrode tab 315 to pass therethrough, and a positive electrode tab hole 342 is formed at the edge of the other side of the insulation case 340 to allow the positive electrode tab 314 to pass therethrough. In addition, an electrolyte passing hole 343 is formed at a location of the insulation case 340, corresponding to the electrolyte injection hole 334.

Turning now to FIG. 3A. The protection circuit module 100 is electrically connected to the bare cell 300 and controls charging and discharging of the battery pack 1000. The protection circuit module 100 includes a printed circuit board 110, a connection tab 120 and a PCT device 130. Since the protection circuit module 100 is substantially the same as that of the previous embodiment, and it is briefly described below.

The printed circuit board 110 is made of a resin shaped of a plate. A terminal hole 111 is formed at the center of the printed circuit board 110, and a spaced-apart portion 112 is formed at one side of the printed circuit board 110. An external terminal 113 is formed on a top surface of the printed circuit board 110, and a circuit device 114 is formed on a bottom surface of the printed circuit board 110. In addition, a positive electrode lead 115 is formed on the bottom surface of either side of the printed circuit board 110.

The terminal hole 111 is a hole used for welding an electrode terminal 331 of the bare cell 300 to the PCT device 130. In one embodiment, the terminal hole 111 may be a through hole penetrating the PCB 110. That is to say, the PCT device 130 and the electrode terminal 331 of the bare cell 300 are welded to each other through the terminal hole 111, and the protection circuit module 100 and the bare cell 300 are electrically connected to each other.

The spaced-apart portion 112 may be formed in the form of a through hole penetrating the printed circuit board 110 from its top surface to its bottom surface. The connection tab 120 is coupled to the spaced-apart portion 112. Like the terminal hole 111, the spaced-apart portion 112 is also a hole used for welding. That is to say, the spaced-apart portion 112 is a hole used for welding the connection tab 120 to the PTC device 130.

The PCT device 130 is electrically connected to the connection tab 120. The PCT device 130 includes a PCT body 131, a first lead 132 and a second lead 133.

As shown in FIG. 1D, the first lead 132 is formed on one surface of the PCT body 131 and is electrically connected to the connection tab 120. The first lead 132 includes a first conductive portion 132a connected to the PTC body 131, a second conductive portion 132b connected to the connection tab 120, and a connecting portion 132c connecting the first conductive portion 132a and the second conductive portion 132b to each other. The second conductive portion 132b of the first lead 132 is welded to the first region 121 of the connection tab 120 to then be coupled to the bottom surface of the connection tab 120. That is to say, since the first lead 132 of the PTC device 130 and the connection tab 120 are welded to each other at the spaced-apart portion 112, it is possible to prevent a soldered portion between the connection tab 120 and the printed circuit board 110 from being melted to cause shorts. In addition, it is possible to prevent the connection tab 120 from being dislodged from the printed circuit board 110.

The second lead 133 is formed on the other surface of the PCT body 131 and is electrically connected to an electrode terminal 331 of the bare cell 330. The second lead 133 includes a first conductive portion 132a connected to the PTC body 131, a second conductive portion 133b connected to the electrode terminal 331 of the bare cell 330, and a connecting portion 133c connecting the first conductive portion 133a and the second conductive portion 133b to each other. The second conductive portion 133b of the second lead 133 is formed at a location corresponding to the terminal hole 111 of the printed circuit board 110. Therefore, the second conductive portion 133b of the second lead 133 may be welded to the electrode terminal 331 of the bare cell 330 through the terminal hole 111.

The upper case 400 has an internal space having an area enough to house the protection circuit module 100, and a lower portion of the upper case 400 is opened. A terminal s hole 410, through which an external terminal 113 of the protection circuit module 100 is exposed, is formed at one side of the upper case 400.

The lower case 500 has a lateral rib 510 at either side thereof to allow the bare cell 300 to be seated thereon, the lateral rib 510 supporting the bare cell 300. The lateral rib 510 may be disposed on two opposite sides of the lower case.

The label sheet 600 may be wrapped around a lower end of the upper case 400, the lateral rib 510 of the lower case 500, and side surfaces of the bare cell 300.

A battery pack according to another embodiment of the present invention will now be described.

Figure 4:
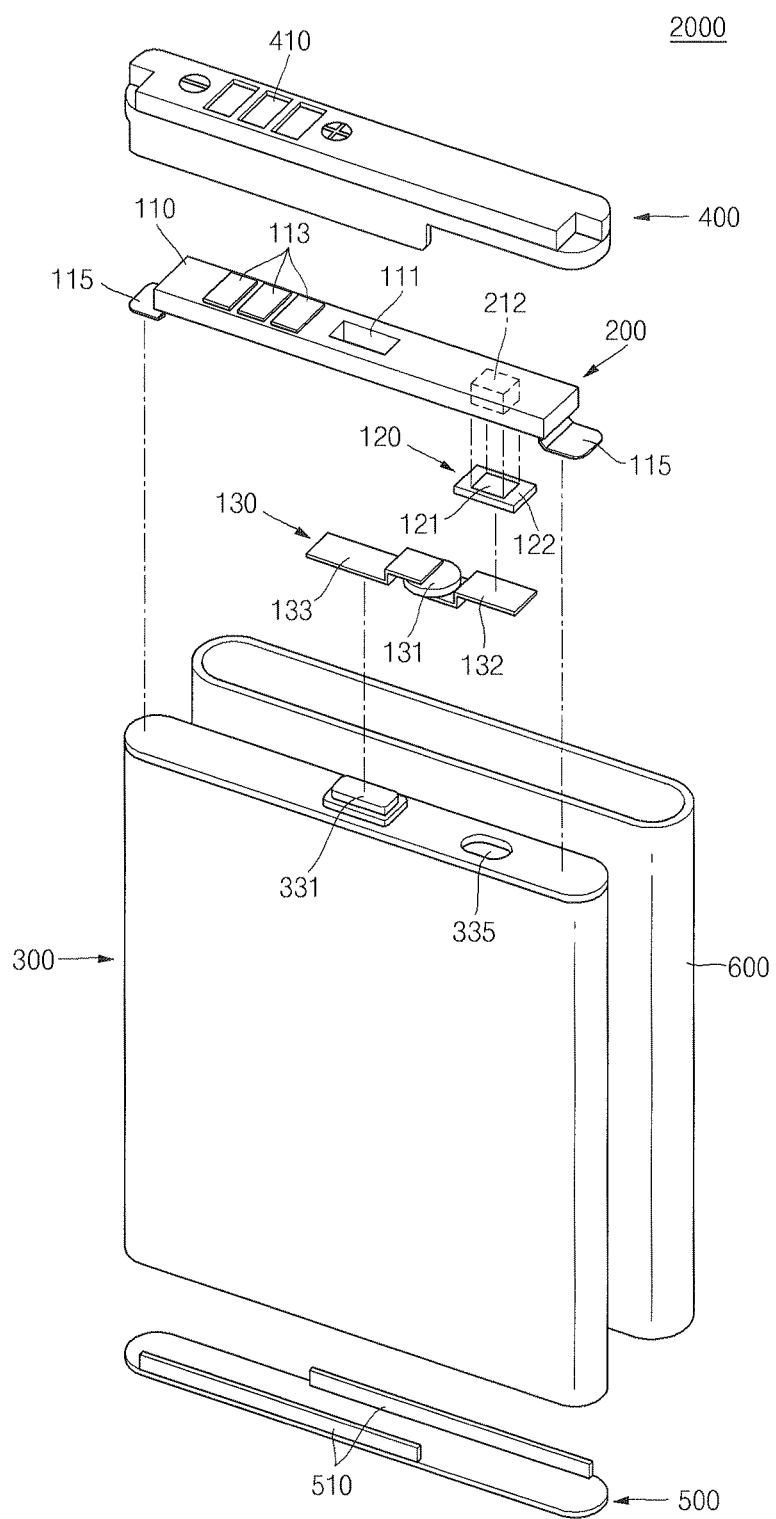
FIG. 4 is an exploded oblique view of a battery pack constructed as another embodiment of the present invention.

FIG. 4 is an exploded perspective view of a battery pack constructed as another embodiment of the present invention.

The battery pack 2000 is substantially the same as the battery pack 1000 shown in FIG. 3A, and only differences therebetween will now be described.

Referring to FIG. 4, the battery pack 2000 includes a bare cell 300, a protection circuit module 200, an upper case 400, a lower case 500 and a label sheet 600.

The protection circuit module 200 includes a printed circuit board 210, a connection tab 120 and a PCT device 130.

The printed circuit board 210 is made of a resin shaped of a plate. A terminal hole 111 is formed at the center of the printed circuit board 210, and a spaced-apart portion 212 is formed at one side of the printed circuit board 210. An external terminal 113 is formed on a top surface of the printed circuit board 210, and a circuit device 114 is formed on a bottom surface of the printed circuit board 210. In addition, a positive electrode lead 115 is formed on the bottom surface of either side of the printed circuit board 210.

As shown in FIG. 2C, the spaced-apart portion 212 may be formed in the form of a hole which does not penetrate the printed circuit board 210. That is to say, since the spaced-apart portion 212 is in the form of a groove, a welding rod (w) contacts the eon lection tab 120 from a bottom surfaces thereof, thereby allowing the first lead 132 of the PTC device 130 to be welded to the connection tab 120. As described above, since the first lead 132 of the PTC device 130 and the connection tab 120 are welded to each other at the spaced-apart portion 212, it is possible to prevent a soldered portion between the connection tab 120 and the printed circuit board 210 from being melted to cause shorts. In addition, it is possible to prevent the connection tab 120 from being dislodged from the printed circuit board 210.

Exemplary embodiments of a protection circuit module and a secondary battery including the same have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a bare cell; and
a protection circuit module electrically connected to the bare cell,
the protection circuit module comprising:
a printed circuit board, the printed circuit board comprising
a terminal hole formed at a center of the printed circuit board and
a spaced-apart portion being spaced apart from the terminal hole and providing a through hole perforating the printed circuit board or a groove;
a connection tab positioned on a bottom surface of the printed circuit board, the connection tab being coupled to a bottom surface of the spaced-apart portion, the connection tab comprising a first region corresponding to the through hole and overlapping the spaced-apart portion and a second region formed at an edge of the first region and coupled to the bottom surface of the printed circuit board; and
a positive temperature coefficient (PTC) device electrically connected to the connection tab, and the PTC device comprising a first lead coupled to a bottom surface of the connection tab, a PTC body electrically connected to the first lead, and a second lead electrically connected to the PTC body.

2. The battery pack of claim 1, wherein the first lead is welded to a bottom surface of the first region of the connection tab and is electrically connected to the bottom surface of the connection tab.

3. The battery pack of claim 1, wherein the bare cell comprises:
an electrode assembly;
a can housing the electrode assembly;
a cap assembly coupled to an upper portion of the can; and
an electrode terminal electrically connected to the electrode assembly and formed at the cap assembly.

4. The battery pack of claim 3, wherein the second lead is welded to the electrode terminal of the bare cell.

5. The battery pack of claim 1, further comprising:
a lower case in which the bare cell is seated; and
an upper case covering the protection circuit module.

6. A protection circuit module, comprising: a printed circuit board, the printed circuit board comprising
a terminal hole formed at a center of the printed circuit board and a spaced-apart portion being spaced apart from the terminal hole and providing
a recess comprised of a through hole or a groove in the circuit board; a connection tab positioned on a bottom surface of the printed circuit board, the connection tab comprising a first region positioned in correspondence with the recess and coupled to and overlapping a bottom surface of the spaced-apart portion and a second region formed at an edge of the first region and coupled to the bottom surface of the printed circuit board; and
a positive temperature coefficient (PTC) device comprising a first lead electrically connected to the connection tab and coupled to a bottom surface of the connection tab, a PTC body electrically connected to the first lead, and a second lead electrically connected to the PTC body.

7. The protection circuit module of claim 6, wherein the recess of the spaced-apart portion comprises a through hole perforating the printed circuit board.

8. The protection circuit module of claim 6, wherein the recess of the spaced-apart portion comprises a groove.

9. The protection circuit module of claim 6, wherein the second lead of the PTC device is spaced apart from the printed circuit board and is formed at a location corresponding to the terminal hole.

10. The battery pack of claim 1, wherein the second lead of the PTC device is spaced apart from the printed circuit board and is formed at a location corresponding to the terminal hole.

11. The protection circuit module of claim 6, wherein the first lead is welded to a bottom surface of the first region of the connection tab and is electrically connected to the bottom surface of the connection tab.

12. The protection circuit module of claim 11, wherein the second lead is disposed to be welded to the electrode terminal of a bare cell.

* * * * *